United States Patent Office 2,773,898
Patented Dec. 11, 1956

2,773,898

PROCESS FOR DRYING PHOSGENE

Georg Brinkmann and Heinz H. Wollthan, Leverkusen, Germany, assignors to Farbenfabriken Bayer Aktiengesellschaft, Leverkusen, Germany, a corporation of Germany No Drawing. Application January 22, 1954, Serial No. 405,650

Claims priority, application Germany January 24, 1953

8 Claims. (Cl. 260—544)

This invention relates to a process for drying phosgene.

In the present specification the term "charcoal" is used to include any kind of activated carbon.

It is well known that phosgene cannot be dried with the conventional drying agents. Thus, calcium chloride is not suitable, since moist phosgene always contains hydrochloric acid, which binds water so firmly that it cannot be absorbed by that drying agent. Alkaline drying agents such as sodium hydroxide and soda-lime are likewise objectionable as the hydrochloric acid contained in moist phosgene incrusts these drying agents by the formation of sodium chloride thus making the same ineffective.

It is an object of the present invention to provide an efficient process for drying phosgene. Another object is to provide a process for drying phosgene which is suitable for commercial operation. Further objects will appear hereinafter. These objects are attained in accordance with the present invention by contacting phosgene with charcoal.

It has now been found that, when moist phosgene is contacted with charcoal, the water contained in the phosgene reacts with the latter according to the equation

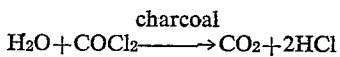

$$H_2O + COCl_2 \xrightarrow{\text{charcoal}} CO_2 + 2HCl$$

In other words, the water content is removed by reaction with an equivalent amount of phosgene while the greater part of the latter is left water-free.

Thus, if 100 grams of phosgene containing 1 percent by weight of water, are subjected to the process of the invention, 5.5 grams of phosgene are used up by reacting with the water so that 93.5 grams of phosgene are obtained water-free.

The contacting of the phosgene with the charcoal in accordance with the invention may be effected in any suitable way. Thus, a mode of carrying out the invention comprises passing the phosgene into and through a drying zone containing charcoal. This drying zone may be defined, for example, by a long hollow cylinder, such as a tube or a tower, which is filled with charcoal. Alternatively, the charcoal may be in the form of moving particles which are passed in contact with the phosgene flowing cocurrently or counter-currently thereto.

The completeness of the drying effected by the process according to the invention may be checked with an aluminum-foil placed in the phosgene stream leaving the drying apparatus. If the drying process is complete the aluminum-foil remains unchanged. If the phosgene, however, contains moisture the aluminum-foil will instantly be attacked owing to the presence of hydrochloric acid in the moist phosgene.

The process of the invention is not restricted to the drying of pure phosgene but can also be applied to mixtures of phosgene with inert gases.

In accordance with the process of the invention large amounts of moist phosgene can be dried with small amounts of charcoal.

The life of the charcoal used in the process of the invention is almost indefinite provided the efficiency of the charcoal is not impaired by the presence of solvent vapors or other substances which are absorbed by activated carbon.

Another embodiment of the invention involves using charcoal as a means for preventing water vapor from diffusing into phosgene or gases containing the same. Thus, a washer and an iron reaction vessel containing phosgene may be connected via a tube filled with charcoal in order to hinder the water vapor present in the washer from diffusing into the reaction vessel, which might result in an undesirable corrosion by formation of hydrochloric acid.

While the above description points out the preferred embodiments of our invention, it is to be understood that departures may be made therefrom within the scope of the invention as described and claimed.

We claim:

1. Process for drying phosgene, which comprises passing a stream of phosgene into, through, and out of a drying zone, while contacting the phosgene with charcoal in said drying zone, the stream of phosgene entering said drying zone containing water vapor which reacts with an equivalent amount of phosgene in said zone in the presence of said charcoal, whereby the stream of phosgene passing out of said zone is dried.

2. Process according to claim 1, in which the charcoal in said drying zone is substantially saturated with phosgene.

3. Process according to claim 1, in which said contacting is effected at about normal temperature.

4. Process according to claim 1, in which said drying zone is defined by a substantially enclosed chamber filled with charcoal, and in which said stream of phosgene is substantially continuously passed into, through, and out of said chamber.

5. Process according to claim 4, in which said enclosed chamber is an elongated, substantially cylindrical, enclosed chamber.

6. Process according to claim 5, in which said enclosed chamber is a tower.

7. Process according to claim 1, in which said contacting of the phosgene with charcoal is effected by passing the stream of phosgene and moving charcoal particles in counter-current contact.

8. Process according to claim 1, in which said stream of phosgene is substantially continuously passed into, through, and out of said drying zone.

References Cited in the file of this patent

UNITED STATES PATENTS

| 1,360,312 | Peacock | Nov. 30, 1920 |
| 1,457,493 | Bradner | June 5, 1923 |
| 2,638,999 | Berg | May 19, 1953 |

OTHER REFERENCES

Engelhard et al.: Z. Electrochem. 40 833–836 (1934), Chem. Abst. 29, 20464.

Conant: The Chemistry of Organic Compounds, rev. ed. 1939, Ninth Printing 1947, The MacMillan Co., p. 246.